US006432187B1

(12) United States Patent
Ogawa et al.

(10) Patent No.: US 6,432,187 B1
(45) Date of Patent: Aug. 13, 2002

(54) FRICTION MATERIAL

(75) Inventors: Hiroshi Ogawa, Tokushima; Minoru Takenaka, Osaka, both of (JP)

(73) Assignee: Otsuka Chemical Co., Ltd., Osaka (JP)

( * ) Notice: Subject to any disclaimer, the term of this patent is extended or adjusted under 35 U.S.C. 154(b) by 0 days.

(21) Appl. No.: 09/646,882

(22) PCT Filed: Feb. 8, 2000

(86) PCT No.: PCT/JP00/00688

§ 371 (c)(1),
(2), (4) Date: Oct. 6, 2000

(87) PCT Pub. No.: WO00/47689

PCT Pub. Date: Aug. 17, 2000

(30) Foreign Application Priority Data

Feb. 9, 1999 (JP) ............................................. 11-031657

(51) Int. Cl.[7] ........................... C09K 3/14; F16D 69/02; C01G 23/00
(52) U.S. Cl. .................... 106/36; 423/593; 423/594; 423/598; 508/108
(58) Field of Search ............................. 106/36; 423/593, 423/594, 598; 508/108

(56) References Cited

FOREIGN PATENT DOCUMENTS

| EP | 1067094 | * | 1/2001 |
|----|---------|---|--------|
| JP | 6-330968 | * | 11/1994 |
| JP | 10-45413 | * | 2/1998 |
| JP | 10-87424 | * | 10/1998 |
| JP | 11-246678 | * | 9/1999 |
| JP | 2000-178026 | * | 6/2000 |
| JP | 2000-264692 | * | 9/2000 |
| JP | 2001-20986 | * | 1/2001 |
| WO | WO00/55093 | * | 9/2000 |

OTHER PUBLICATIONS

Database WPI, Section Ch, Week 1999901, & JP 10 279924 A, Oct. 20, 1998.
JP–315817, A and English Abstract Thereof (Dec. 1997).

* cited by examiner

*Primary Examiner*—Anthony Green
(74) *Attorney, Agent, or Firm*—Townsend & Banta

(57) ABSTRACT

A friction material characterized as containing, as a friction control agent, 3–50% by weight of one or more substances selected from flat layered titanates represented by the general formula (1), $A_x M_y Ti_{2-y} O_4$ (wherein A represents an alkaline metal other than lithium; M represents one or more elements selected from lithium, magnesium, zinc, nickel, copper, iron, aluminum, gallium and manganese; x is a number of 0.5–1.0; and y is a number of 0.25–1.0) and flat layered titanic acids represented by the general formula (2), $H_x (M'_y)_z Ti_{2-y} O_4 \cdot n H_2 O$ (wherein M' represents one or more elements selected from lithium, magnesium, zinc, nickel, copper, iron, aluminum, gallium and manganese; x is a number of 0.5–1.0; y is a number of 0.25–1.0; z is a number of 0 or 1; and n is a number of $0 \leq n \leq 2$).

5 Claims, 1 Drawing Sheet

FRICTION MATERIAL

TECHNICAL FIELD

The present invention relates to friction materials suitable for use in braking members, e.g., clutch facings and braking elements, incorporated in braking devices as for automobiles, aircrafts, railway vehicles and industrial apparatuses.

BACKGROUND ART

Friction materials as heretofore used to form braking members utilize asbestos dispersed in and integrated by organic or inorganic binders. However, such friction materials have suffered from insufficient friction and abrasion properties. Also, asbestos is a cancer-causing substance and presents an environmental hygienic problem. Under these circumstances, it has been strongly demanded to develop asbestos substitutes.

In response to such demands, friction materials have been proposed which utilize potassium titanate fibers as base fibers or a friction control agent. The potassium titanate fiber is non-carcinogenic, unlike asbestos, shows good heat resistance and is effective in preventing a fading phenomenon and stabilizing friction properties against heat.

However, the incorporation of potassium titanate fibers in friction materials has not yet presented a sufficient solution to "braking noise" developed in braking devices.

Also, the potassium titanate fibers, because of their fibrous form, have a greater bulk and a lower degree of fluidity, leading to their tendency to deposit on a wall of a feed passage and block the passage during the manufacture of friction materials, which has been a problem.

The present invention is directed toward solving the above-described problems and its object is to provide a friction material which exhibits excellent friction and abrasion properties and is highly productive.

DISCLOSURE OF THE INVENTION

The friction material of the present invention is characterized as containing, as a friction control agent, 3–50% by weight of one or more substances selected from flat layered titanates represented by the general formula (1), $A_xM_yTi_{2-y}O_4$ (wherein A represents an alkaline metal other than lithium; M represents one or more elements selected from lithium, magnesium, zinc, nickel, copper, iron, aluminum, gallium and manganese; x is a number of 0.5–1.0; and y is a number of 0.25–1.0) and flat layered titanic acids represented by the general formula (2), $H_x(M'_y)_zTi_{2-y}O_4 \cdot nH_2O$ (wherein M' represents one or more elements selected from lithium, magnesium, zinc, nickel, copper, iron, aluminum, gallium and manganese; x is a number of 0.5–1.0; y is a number of 0.25–1.0; z is a number of 0 or 1; and n is a number of $0 \leq n \leq 2$). Specifically, A may be sodium, potassium, rubidium or cesium, for example.

The substances for use as a friction control agent in the present invention, i.e., the flat layered titanates and titanic acids as respectively represented by the general formulas (1) and (2) have friction and abrasion properties better stabilized against temperature change, which make them particularly suitable for use as a friction control agent incorporated in friction materials. Due to their non-fibrous form, contrary to potassium titanate fibers, they are unlikely to block a feed passage during a manufacturing process. Also, due to the absence of respirable fibers, a working environment is unlikely to be adversely affected.

The friction material of the present invention, because of its inclusion of a flat layered titanate and/or a titanic acid as a friction control agent, have the following functions and effects.

(1) The friction and abrasion properties are stabilized because of the flat layered structure of the friction control agent.

(2) The strength of friction materials is improved as a result of the higher aspect ratio of the friction control agent.

(3) The preparation of a raw material mixture is facilitated by the increased fluidity of the friction control agent.

(4) A working environment is kept in a clean condition because the production of respirable dusts is maintained at a very low degree of occurrence.

(5) A friction coefficient is kept stable over a wide temperature range from low to high temperature because of the increased heat resistance.

BEST MODE FOR CARRYING OUT THE INVENTION

Figure 1:
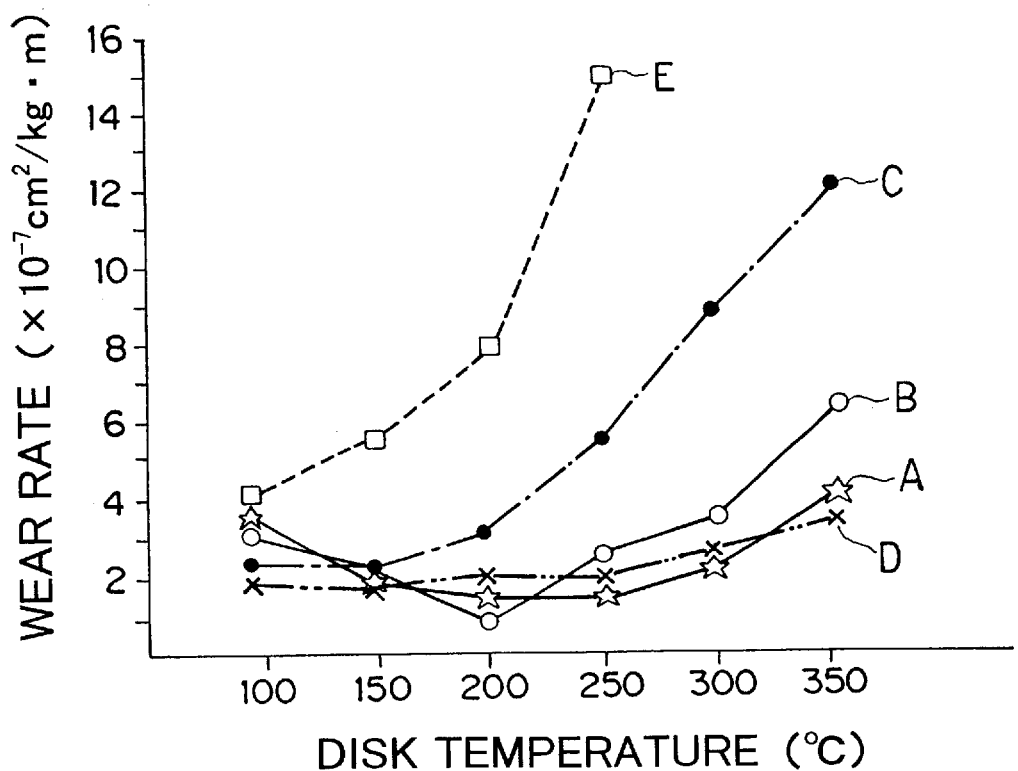
FIG. 1 is a graph showing a relationship between a disc pad temperature of a disc pad under test and a wear rate.

Specific examples of flat layered titanates represented by the general formula (1) are $K_{0.8}Zn_{0.4}Ti_{1.6}O_4$, $K_{0.8}Mg_{0.4}Ti_{1.6}O_4$ and $K_{0.8}Li_{0.27}Ti_{1.73}O_4$. Specific examples of flat layered titanic acids represented by the general formula (2) include $H_{0.8}Zn_{0.4}Ti_{1.6}O_4 \cdot nH_2O$ (n denotes a number of $0 \leq n \leq 2$), $H_{0.8}Mg_{0.4}Ti_{1.6}O_4 \cdot nH_2O$ (n denotes a number of $0 \leq n \leq 2$) and $H_{0.8}Li_{0.27}Ti_{1.73}O_4 \cdot nH_2O$ (n denotes a number of $0 \leq n \leq 2$).

The flat layered titanic acid represented by the general formula (2) can be obtained by subjecting the flat layered titanate represented by the general formula (1) to an acid treatment so that an alkaline metal ion located at a site of A is substituted with a hydrogen ion. Hydrochloric acid is most generally used in the acid treatment. However, the use of hydrochloric acid is not limiting. Other acids, such as mineral acids and organic acids, can also be used.

For example, the flat layered titanate as specified by $K_{0.8}Mg_{0.4}Ti_{1.6}O_4$, if properly treated with an acid, yields the flat layered titanic acid as specified by $H_{0.8}Mg_{0.4}Ti_{1.6}O_4 \cdot nH_2O$ (n denotes a number of $0 \leq n \leq 2$).

It is particularly preferred that these flat layered titanates and titanic acids have a length dimension of 10–500 μm and a breadth dimension (thickness) of 50–1,000 nm.

Either or both of the flat layered titanate and titanic acid are incorporated in the friction material in the amount of 3–50% by weight. Unless they are incorporated in the amount of at least 3% by weight, an effect of improving friction and abrasion properties may not be developed. On the other hand, if the amount exceeds 50% by weight, the effect of improving friction and abrasion properties may not be furthered, resulting in an economical disadvantage.

While not intended to be limiting, the following procedure can be utilized to synthesize the flat layered titanates of the general formula (1) and titanic acids of the general formula (2) for use as a control agent in the present invention.

Illustrating the synthesis of $K_{0.8}Mg_{0.4}Ti_{1.6}O_4$ (flat layered titanate of general formula (1) wherein A is potassium, M is manganese, x is 0.8 and y is 0.4), a crystalline powder consisting of $K_2O$, MgO and $TiO_2$ mixed in a molar ratio of 0.5:0.5:1.5 and a flux powder consisting of $K_2O$ and $MoO_3$ mixed in a molar ratio of 1.0:1.0 are blended in a molar percentage of 30:70. The blend was heated at a temperature of 1,100–1,200° C. and then cooled gradually to allow crystal growth. The resulting product was moistured with a hot water. The removal of flux from the product results in obtaining $K_{0.8}Mg_{0.4}Ti_{1.6}O_4$, one of the flat layered titanates according to the present invention.

Those skilled in the art will readily recognize that the flat layered titanates of the general formula (1) with optional A, M, x and y can be obtained by suitably selecting the types of materials used and their molar blending ratios. Also, the flat layered titanate of the general formula (1), when treated with an acid to substitute its alkaline metal with hydrogen, yields the flat layered titanic acid of the general formula (2).

Specifically, the friction material of the present invention may comprise base fibers, a friction control agent and a binder, for example. More specifically, the friction material may comprise, by weight, 1–60 parts of base fibers, 20–80 parts of the flat layered titanate or/and titanic acid respectively represented by the general formulas (1) and (2), as the friction control agent, 10–40 parts of the binder and 0–60 parts of other additives, for example.

Examples of base fibers include resin fibers such as aramid fibers, metal fibers such as steel fibers and brass fibers, carbon fibers, glass fibers, ceramic fibers, rock wool, wood pulps and the like. For the purpose of improving dispersibility and adherence to the binder, such base fibers may be surface treated with silane coupling agents such as amino, epoxy and vinyl silane coupling agents; titanate coupling agents; phosphate esters or the like.

Other than at least one selected from the flat layered titanates of the general formula (1) and the flat layered titanic acids of the general formula (2), the friction control agent for use in the friction material of the present invention may further contain other type of auxiliary friction control agent within the range that does not impair the desired effect of this invention. Examples of such auxiliary friction control agents include vulcanized or unvulcanized natural and synthetic rubber powders; cashew resin powder; organic powders such as resin dust and rubber dust; inorganic powders such as carbon black, graphite powder, molybdenum disulfide, barium sulfate, calcium carbonate, clay, mica, talc, diatomite, antigorite, sepiolite, montmorillonite, zeolite, sodium trititanate, sodium pentatitanate, potassium hexatitanate, potassium octatitanate; metal powders such as of copper, aluminum, zinc and iron; oxide powders such as alumina, silica, chromium oxide, titanium oxide and iron oxide.

Examples of binders include organic binders and inorganic binders. Examples of organic binders include thermosetting resins such as phenol, formaldehyde, melamine, epoxy, acrylic, aromatic polyester and urea resins; elastomers such as natural, nitorile, butadiene, styrene-butadiene, chloroprene, polyisoprene, acrylic, high styrene rubbers and styrene-propylene-diene copolymer; thermoplastic resins such as polyamide, polyphenylene sulfide, polyether, polyimide, polyether ether ketone and thermoplastic crystalline polyester resins. Examples of inorganic binders include alumina sol, silica sol, silicone resins and the like.

Besides the above-described components, the friction material of this invention may further contain a rust preventive, wetting agent, abrasive and the like, when needed.

The method used to manufacture the friction material of this invention is not particularly specified. Those methods conventionally known in the friction material art can be suitably employed.

Illustrating one method for manufacturing the friction material of this invention, base fibers are dispersed in a binder. A control agent and other additives, if necessary, are added to the dispersion to prepare a friction material composition which is subsequently poured in a mold where it is heat compressed into an integral form.

Illustrating another method for manufacturing the friction material of this invention, a binder is melt kneaded in a twin-screw extruder into which base fibers, a friction control agent and other additives, if needed, are introduced from a side hopper. The melt mixture is extruded and then machined to a desired size.

Illustrating still another method for manufacturing the friction material of this invention, a friction material composition is dispersed in water, caught on a net and then dewatered to provide a sheet web which is subsequently heat pressed into an integral form. The resulting friction material is properly cut and/or abrasive machined to a desired shape.

The present invention will be now described in more detail with reference-to Example, Comparative Example and Experimental Example.

EXAMPLE

A mixture containing 20 parts by weight of flat layered titanate (length of 50–60 $\mu$m, breadth (thickness) of 0.3 $\mu$m and aspect ratio of about 180–200) represented by the formula $K_{0.8}Mg_{0.4}Ti_{1.6}O_4$, 10 parts by weight of aramid fibers (manufactured by Toray Co., Ltd. and named in trade as "Kevlar Pulp", average fiber lenght of 3 mm), 20 parts by weight of binder (phenol resin) and 50 parts by weight of barium sulfate was preformed under a pressure of 300 kgf/cm$^2$ at ordinary temperature for 1 minute, integrated in mold (under a pressure of 150 kgf/cm$^2$ at 170° C., for 5 minutes) and then subjected to a heat treatment (maintained at 180° C. for 3 hours) . After removal from the mold, the resulting form was abrasive finished to obtain a test disc pad A (JIS D 4411 test piece).

Comparative Example

For comparative purposes, the procedure of Example was followed, with the exception that 30 parts by weight of a combination of the flat layered titanate and aramid fibers was replaced by 30 parts by weight of the below-specified test material B, C, D or E, to prepare test disc pads B–E.

Test material B: potassium pentatitanate fibers (cross-section size: 5–10 $\mu$m, aspect ratio of 5)

Test material C: asbestos fibers (6 Class)

Test material D: coarse-size potassium pentatitanate fibers (cross-section size of 20–50 $\mu$m, length of 100–300 $\mu$m)

Test material E: fine needle-like potassium octatitanate fibers (cross-section size of 0.2–0.5 $\mu$m, length of 5–15 $\mu$m)

FRICTION TEST

Figure 2:
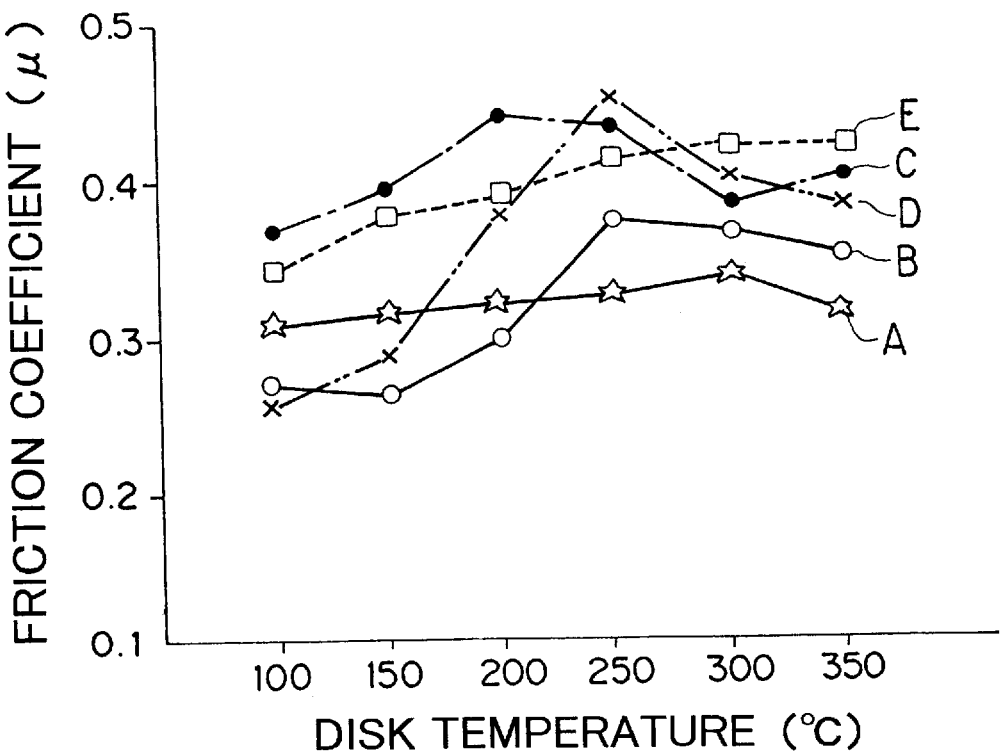
FIG. 2 is a graph showing a relationship between a disc pad temperature of a disc pad under test and a friction coefficient.

Each of the test disc pads A–E was subjected to a constant speed friction/abrasion test (disc friction surface: FC25 gray cast iron, pressure: 10 kgf/cm$^2$, friction speed: 7 m/sec) according to JIS D 4411 "Automotive brake lining", to measure its wear rates (cm$^3$/Kgm) and friction coefficients ($\mu$). The measurement results are shown in FIGS. 1 and 2.

As can be clearly seen from the results, the friction material (test disc pad A) of the present invention exhibits the superior abrasion resistance over a range from low to high temperatures compared to the test disc pad C of Comparative Example which utilizes asbestos fibers. Its friction coefficients have been also found to be relatively stable against temperature change.

While exhibiting high friction coefficients and good stability against temperature change, the test disc pad E (Comparative Example) utilizing fine needle-like potassium titanate fibers shows a rapid increase in abrasion rate with temperature elevation.

The test disc pad D (Comparative Example) using coarse-size potassium pentatitanate fibers exhibits stable abrasion characteristics as similar to the friction material of the present invention, but its friction coefficient shows the inferior thermal stability compared to that of the friction material of the present invention.

The flat layered titanate represented by the formula $K_{0.8}Mg_{0.4}Ti_{1.6}O_4$ as used in the Example was treated with an acid to prepare a flat layered titanic acid represented by the formula $H_{0.8}Mg_{0.4}Ti_{1.6}O_4 \cdot nH_2O$. The procedure of Example was followed, except that 20 parts by weight of the above-prepared titanic acid was used as a friction control agent, to make a test disc pad which was subsequently subjected to a friction test in the same manner as in the above-described Experimental Example. The results have demonstrated that this disc pad, like the test disc pad A, shows good abrasion characteristics over a range from low to high temperatures and good thermal stability of its friction coefficient.

UTILITY IN INDUSTRY

The friction material of the present invention shows good and stable friction coefficient and abrasion resistance over a wide temperautre range from low to high temperatures. Accordingly, its use for braking members, e.g., clutch facings, brake linings and disc pads, incorporated in braking devices as of automobiles, aircrafts, railway vehicles and industrial apparatuses not only improves and stabilizes their braking functions but also extends their service lives.

What is claimed is:

1. A friction material comprising, as a friction control agent, 3–50% by weight of one or more substances selected from the group consisting of flat layered titanates represented by general formula (1) as follows:

$$A_xM_yTi_{2-y}O_4 \quad (1)$$

wherein A represents an alkaline metal other than lithium; M represents one or more elements selected from the group consisting of lithium, magnesium, zinc, nickel, copper, iron, aluminum, gallium and manganese; x is a number from 0.5–1.0; and y is a number from 0.25–1.0, and flat layered titanic acids represented by general formula (2) as follows:

$$H_x(M'_y)_zTi_{2-y}O_4 \cdot nH_2O \quad (2)$$

wherein M' represents one or more elements selected from the group consisting of lithium, magnesium, zinc, nickel, copper, iron, aluminum, gallium and manganese; x is a number from 0.5–1.0; y is a number from 0.25–1.0; z is 0 or 1; and n is a number of $0 \leq n \leq 2$.

2. The friction material as recited in claim 1, wherein A is potassium and M is zinc or magnesium.

3. The friction material as recited in claim 1, wherein M' is zinc or magnesium.

4. The friction material as recited in claim 1, wherein A is potassium and M is lithium.

5. The friction material as recited in claim 1, wherein the flat layered titanate or titanic acid has a length of 10–500 μm and a breadth (thickness) of 50–1,000 nm.

* * * * *